United States Patent
Carlier et al.

(10) Patent No.: US 12,265,176 B2
(45) Date of Patent: Apr. 1, 2025

(54) METHOD FOR MANAGING A SECONDARY RADAR OPERATING IN MODE S TO AVOID THE PROBLEM OF BDS SWAP

(71) Applicant: THALES, Courbevoie (FR)

(72) Inventors: David Carlier, Ymare (FR); Lionel Matias, Elancourt (FR); Philippe Reuillon, Arlington, VA (US); Yves Meignan, Limours (FR)

(73) Assignee: THALES, Courbevoie (FR)

( * ) Notice: Subject to any disclaimer, the term of this patent is extended or adjusted under 35 U.S.C. 154(b) by 92 days.

(21) Appl. No.: 17/744,702

(22) Filed: May 15, 2022

(65) Prior Publication Data
US 2023/0031350 A1    Feb. 2, 2023

(30) Foreign Application Priority Data
May 25, 2021  (FR) ..................... 2105395

(51) Int. Cl.
  *G01S 7/40*  (2006.01)
  *G01S 13/87*  (2006.01)

(52) U.S. Cl.
  CPC .......... *G01S 7/4091* (2021.05); *G01S 7/4026* (2013.01); *G01S 13/872* (2013.01)

(58) Field of Classification Search
  CPC ..... G01S 7/4091; G01S 7/4026; G01S 13/872
  See application file for complete search history.

(56) References Cited

U.S. PATENT DOCUMENTS

| | | | | |
|---|---|---|---|---|
| 7,612,705 B2* | 11/2009 | Ino | ..................... | G01S 13/781 |
| | | | | 342/37 |
| 7,880,667 B2* | 2/2011 | Lanzkron | ............... | G08G 5/727 |
| | | | | 342/36 |
| 10,795,016 B2* | 10/2020 | Hauswald | ............ | G08G 5/0026 |

(Continued)

FOREIGN PATENT DOCUMENTS

JP    2009109420 A   *  5/2009

OTHER PUBLICATIONS

P. Mariano, P. De Marco and C. Giacomini, "Data integrity augmentation by ADS-B SSR hybrid techniques," 2018 Integrated Communications, Navigation, Surveillance Conference (ICNS), Herndon, VA, USA, 2018, pp. 4F1-1-4F1-10, doi: 10.1109/ICNSURV.2018.8384893. (Year: 2018).*

(Continued)

*Primary Examiner* — Vladimir Magloire
*Assistant Examiner* — Noah Yi Min Zhu
(74) *Attorney, Agent, or Firm* — BakerHostetler

(57) ABSTRACT

A a method for managing a secondary radar operating in Mode S, the method includes a) a detection in "seeking mode", the "seeking mode" being implemented until an aircraft is detected by the secondary radar; b) a detection in "tracking mode", the "tracking mode" being implemented if a valid response to a roll-call interrogation was detected in "seeking mode"; the method comprising an intermediate step a1), which is executed between the detection in "seeking mode" and the detection in "tracking mode", the intermediate step comprising: detecting the presence or absence of the reply of the aircraft in a noise window of the secondary radar; carrying out at least one roll-call interrogation, using the first monitoring window, if the reply of the aircraft is not located in the noise window.

10 Claims, 6 Drawing Sheets

(56) References Cited

U.S. PATENT DOCUMENTS

| | | | |
|---|---|---|---|
| 11,333,750 B2* | 5/2022 | Li | G01S 13/933 |
| 2005/0083226 A1* | 4/2005 | Kuji | G01S 13/781 |
| | | | 342/40 |
| 2011/0279302 A1* | 11/2011 | Billaud | G01S 13/782 |
| | | | 342/45 |
| 2013/0265186 A1* | 10/2013 | Gelli | G01S 13/782 |
| | | | 342/32 |
| 2019/0355260 A1* | 11/2019 | Billaud | G01S 13/782 |
| 2020/0312156 A1* | 10/2020 | Sakamaki | G08G 5/0021 |
| 2022/0137206 A1* | 5/2022 | Li | G01S 13/003 |
| | | | 342/37 |

OTHER PUBLICATIONS

Mariano, et al., "Data integrity augmentation by ADS-B SSR hybrid techniques", 2018 Integrated Communications, Navigation, Surveillance Conference (ICNS), 2018.

Koga, et al., "Autonomous continuous target tracking technology for safety in air traffic radar systems network", Proceedings of 2011 IEEE 6th International Symposium on Service Oriented System (SOSE), pp. 235-240, 2011.

Matsunaga, et al., "SSR Mode S downlink aircraft parameters validation and evaluation", 2013 Integrated Communications, Navigation and Surveillance Conference (ICNS), 2013.

EASA.2016.FC19 SC.001, EUROCAE Study: Analysis of differences between amendments—ICAO Annex 10, vol. IV, European Union Aviation Safety Agency, 2016.

* cited by examiner

METHOD FOR MANAGING A SECONDARY RADAR OPERATING IN MODE S TO AVOID THE PROBLEM OF BDS SWAP

CROSS-REFERENCE TO RELATED APPLICATION

This application claims priority to foreign French patent application No. FR 2105395, filed on May 25, 2021, the disclosure of which is incorporated by reference in its entirety.

FIELD OF THE INVENTION

The invention generally relates to radar systems, and in particular to a method and device for managing a secondary radar operating in Mode S.

BACKGROUND

Secondary radars are used for air-traffic control (ATC). A secondary radar, in contrast to a primary radar, which exploits reflection of an electromagnetic wave from an aircraft, interacts with a transponder located on an aircraft, or with an IFF responder located on-board a military aircraft, by interrogating it in order to obtain at least its identification (code 3/A) and its altitude (code C) and to determine its position.

In first-generation secondary radars (modes A/C), the transponders replied systematically to all secondary-radar interrogations, which generated a lot of RF pollution or interference. Moreover, the content of the replies was limited by the number of data bits (at most 12 bits).

Mode S, the S standing for selective, which is widely implemented at the current time, allows a high number of aircraft to be interrogated and tracked in the region of coverage of the radar, while decreasing RF pollution.

As with first-generation secondary radars, the Mode S secondary radar, on detecting a reply, receives the altitude and the address of the aircraft and determines its position therefrom. The radar may also receive information on the type of aircraft, its speed, its heading, etc. These additional data are presented in the form of registers (BDS for Comm-B Data Selector) that are identified by a number, and that are available on request (one BDS per interrogation).

In Mode S, interrogations are either of all-call type (general interrogation) or of roll-call type (selective interrogation). In an all-call interrogation, the radar asks all the transponders located in its region of coverage to supply, on 24 bits, their Mode S address, i.e. their identification number.

Once the radar has acquired the aircraft, i.e. once it is capable of predicting the position thereof, in each new antenna revolution it initially interrogates the aircraft in roll-call mode in a large spatial window to cover prediction-related uncertainties, this phase being called "seeking mode" below. The radar thus obtains a first precise position of the aircraft, allowing it to decrease the size of the interrogation window used for subsequent roll-call interrogations and to dedicate the rest of the space/time to interrogation of the other aircraft present in its domain of surveillance. This second phase is called "tracking mode" below.

FIG. 1 illustrates the decrease, in a given antenna revolution, in the size of the window in "tracking mode", this window being centred on the aircraft detected in "seeking mode".

Once the acquisition of the aircraft has been confirmed, the radar locks out the transponder of the aircraft in question for eighteen seconds. The locked-out transponder of the aircraft no longer responds to all-call interrogations from an interrogating radar having the same radar station code as the radar that locked out the aircraft. This lockout is renewed (the lock-out time is reset, i.e. a new lockout lasting eighteen seconds begins) on each roll-call interrogation containing a lock-out command.

When two radars transmit an interrogation to a given transponder and these interrogations reach the transponder almost simultaneously, the transponder emits only one reply to the two interrogations.

The radar (radar 1) the interrogation of which was taken into account by the transponder receives a reply (containing a BDS) consistent with its interrogation. In contrast, the second radar (radar 2), the interrogation of which was ignored, receives the same (therefore erroneous) reply, which does not correspond to its interrogation but to the interrogation of radar 1. In addition, radar 2 never receives a reply to the interrogation that it sent.

Such an issue is referred to as a BDS swap. The issue of BDS swapping may be observed in regions containing a high density of Mode S secondary radars. This issue impacts the effectiveness of the surveillance system and hence needs to be corrected. Known automatic systems for managing air traffic may be able to handle such anomalies, but only after a plurality of antenna revolutions (i.e. a plurality of rotations of the moving part of the antenna).

This issue and its consequences have been described in detail by the European Union Aviation Safety Agency in its document EASA.2016.FC19 SC.001. In particular, use by the radar of incorrect data may induce it to make erroneous changes to acceleration or flight path.

FIG. 2 illustrates the consequences of BDS swap in the case where incorrect data have induced the radar to make an error in respect of its actual distance to the aircraft. The radar having detected a wrong BDS reply, it deduces therefrom an erroneous distance. Thus, the size of the monitoring window, in "tracking mode", is decreased but around this erroneous distance. In the same antenna revolution, the radar continues to interrogate the transponder but ignores its replies because they are not positioned in the right monitoring window.

In the following antenna revolution, the radar continues to interrogate the transponder in a predicted window computed on the basis of the preceding position, which position is erroneous. As illustrated in FIG. 3, since this predicted position is far from the true path, the radar has no chance of re-acquiring the transponder (for example, to the radar the target seems to have made an abrupt 90° turn).

Since the transponder is locked out, it no longer responds to all-call interrogations, and hence the radar cannot relocate it. It is necessary to wait for the lockout of the transponder to end and for the aircraft to be acquired again by the radar.

The prior art provides solutions that solve the problems of BDS swaps.

A first solution consists in verifying the consistency of UF/DF messages (UF/DF standing for uplink format/downlink format). Specifically, the interrogations (UF messages) are sent by the radar to the transponder and the replies (DF messages) are transmitted by the transponder to the radar.

If the reply does not correspond to the request, the reply is rejected.

For example, only a reply of DF=4 (surveillance, altitude reply) or a reply of DF=20 (Comm-B, altitude reply) is expected in response to an interrogation of UF=4 (surveillance, altitude request). Only a reply of DF=5 (surveillance, identify reply) or a reply of DF=21 (Comm-B, identify reply) is expected in response to an interrogation of UF=5 (surveillance, identify request).

However, this solution does not allow the BDS-swap issue to be avoided when two interrogators request the same information. Unfortunately, in air-traffic control, it is often the same information that is requested.

A second solution consists in verifying the consistency of the first byte of the register BDS 1,0, of the register BDS 2,0 or even of the register BDS 3,0. When the BDS number is extractable from the reply, this solely being the case for these registers, the processing pipeline verifies whether the interrogation was intended for these BDS.

However, this solution does not work with all BDS registers.

A third known solution consists in including the number of the BDS in the parity code of the DF reply containing the BDS returned by the transponder. Thus, when the interrogator receives the reply, it may verify, by virtue of a parity check, whether the reply corresponds to the expected BDS register. This solution corresponds to the technique referred to as BDS overlay, which was introduced in Amendment 89 of ICAO Annex 10 Volume IV.

However, the deployment of this solution requires transponder software to be updated, this being constraining.

Document D1 "Data Integrity Augmentation by ADS-B SSR Hybrid Techniques" (Mariano et al., 2018 Integrated Communications, Navigation and Surveillance Conference) presents an interactive monitoring solution for systems for managing air traffic. Document D1 does not however seek to solve the problem of BDS swapping.

Document D2 "Autonomous Continuous Target Tracking Technology for Safety in Air Traffic Radar Systems Network" (Koga et al., 2011 IEEE 6th International Symposium on Service Oriented System Engineering) describes tracking an aircraft with two radars, but does not seek to solve the problem of BDS swapping.

There is thus a need for an improved method and device for managing a secondary radar.

SUMMARY OF THE INVENTION

One subject of the invention is therefore a method for managing a secondary radar operating in Mode S, the method comprising:

a) a detection in "seeking mode", said "seeking mode" being implemented until an aircraft is detected by the secondary radar, the "seeking mode" comprising a plurality of all-call secondary-radar interrogation periods, and a plurality of roll-call interrogation periods, in a first monitoring window;

b) a detection in "tracking mode", said "tracking mode" being implemented if a valid response to a roll-call interrogation was detected in "seeking mode", the "tracking mode" comprising a plurality of all-call interrogation periods, and a plurality of roll-call interrogation periods, in a second monitoring window, said second monitoring window being around the aircraft position predicted by the secondary radar in response to an all-call interrogation;

the method being characterized in that it comprises an intermediate step a1), which is executed between the detection in "seeking mode" and the detection in "tracking mode", said intermediate step comprising:

detecting the presence or absence of the reply of the aircraft in a noise window of the secondary radar;

carrying out at least one roll-call interrogation, using the first monitoring window, if the reply of the aircraft is not located in said noise window.

The method advantageously comprises the following embodiments:

The secondary radar comprises an antenna, the first monitoring window being computed, for a given aircraft, on the basis of the speed of rotation of the antenna of the secondary radar, and of the aircraft position predicted for the following antenna revolution.

The predicted aircraft position is computed on the basis of all the possible aircraft positions, these being computed on the basis of the known path of the aircraft and of rate-related aircraft parameters received by the secondary radar.

The noise window is computed on the basis of the difference between an ideal path of the aircraft and an aircraft position predicted by the secondary radar.

The ideal path of the aircraft is computed on the basis of a set of assumptions stating that the aircraft will fly along a straight path at a constant aircraft speed.

The predicted aircraft position is computed on the basis of a set of computed discrepancies, a discrepancy corresponding to the difference between an estimate of the position of the aircraft and an aircraft position measured in one of the preceding revolutions starting from when the aircraft was first detected.

The discrepancy is integrated with respect to time using a recurrent filter.

The recurrent filter is an extended Kalman filter.

The predicted aircraft position is computed on the basis of the measurement error of the radar.

The invention also relates to a secondary radar configured to implement the aforementioned method.

BRIEF DESCRIPTION OF THE DRAWINGS

Other features, details and advantages of the invention will become apparent on reading the description, which is given with reference to the appended drawings, which are given by way of example and which show, respectively.

DETAILED DESCRIPTION

Figure 1:
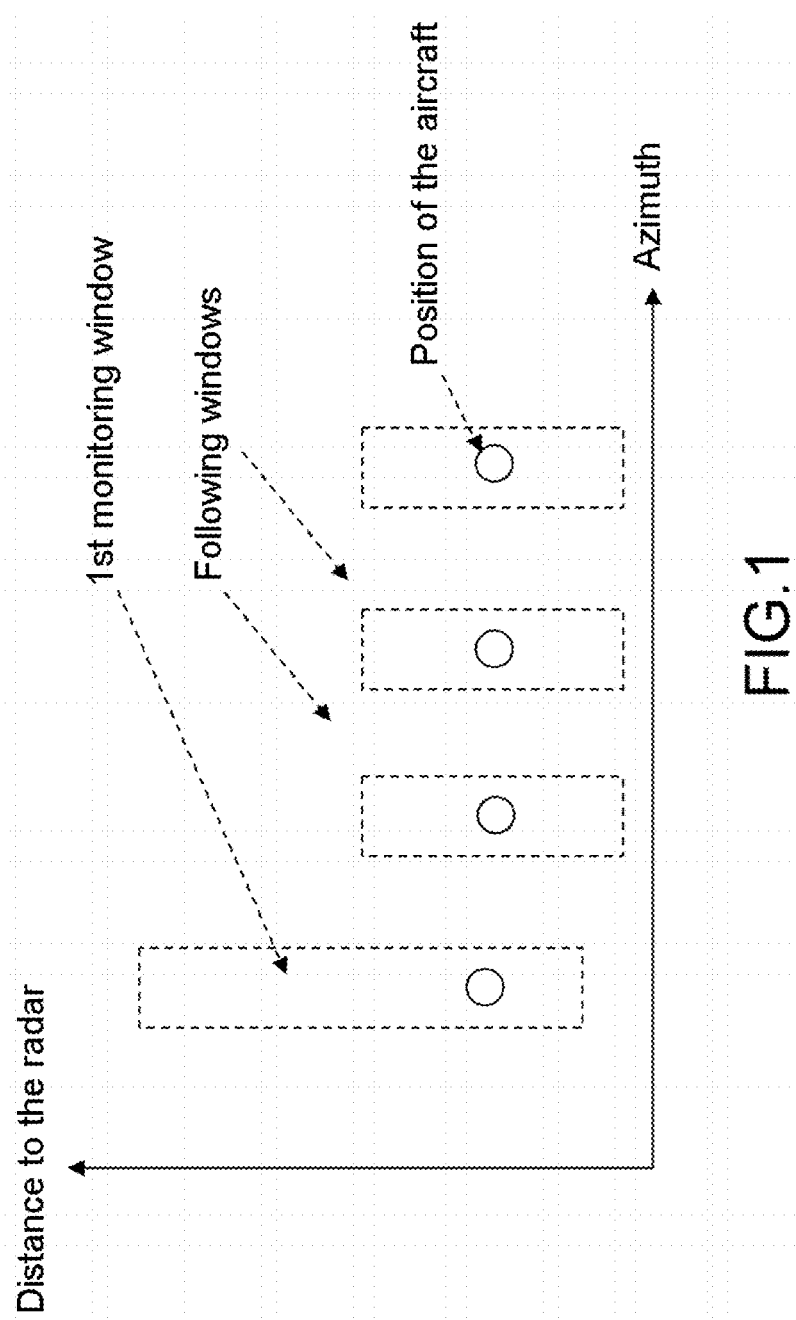
FIG. 1, which has already been described, the decrease in the interrogation window between the "seeking mode" and the "tracking mode", in a nominal case (no BDS swap)
Figure 2:
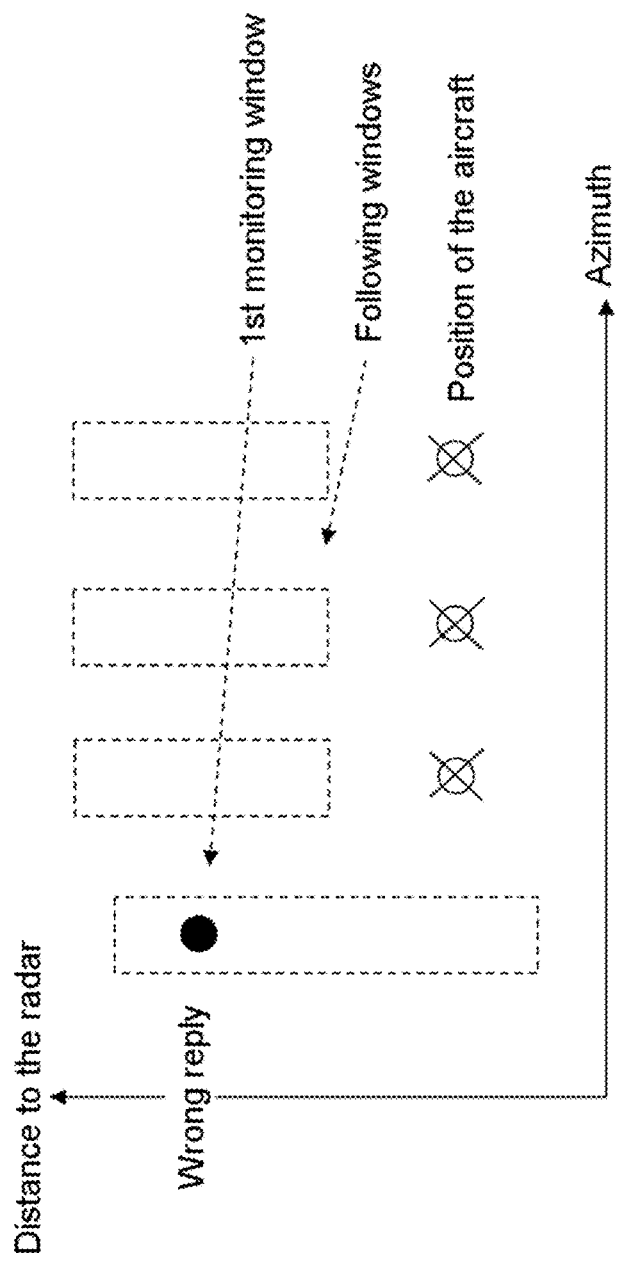
FIG. 2, which has already been described, the decrease in the interrogation window between the "seeking mode" and the "tracking mode", in one case of failure (following a BDS swap)
Figure 3:
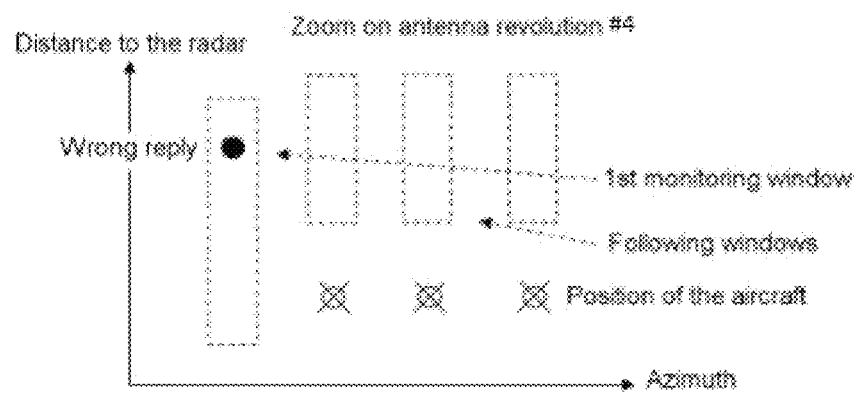
FIG. 3, which has already been described, the appearance of a BDS swap and an erroneous location of the aircraft.
Figure 3:
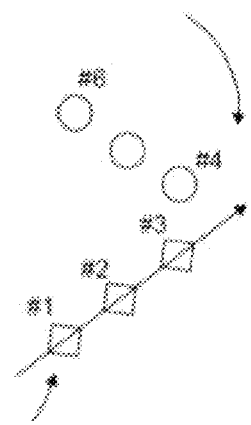
Figure 3:
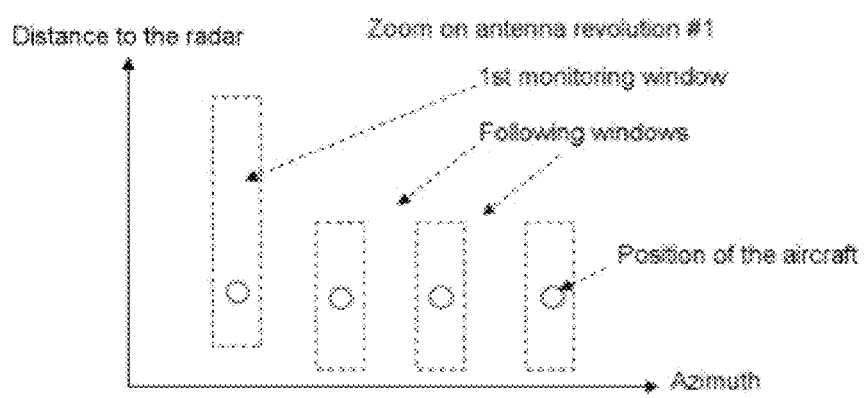
Figure 4:
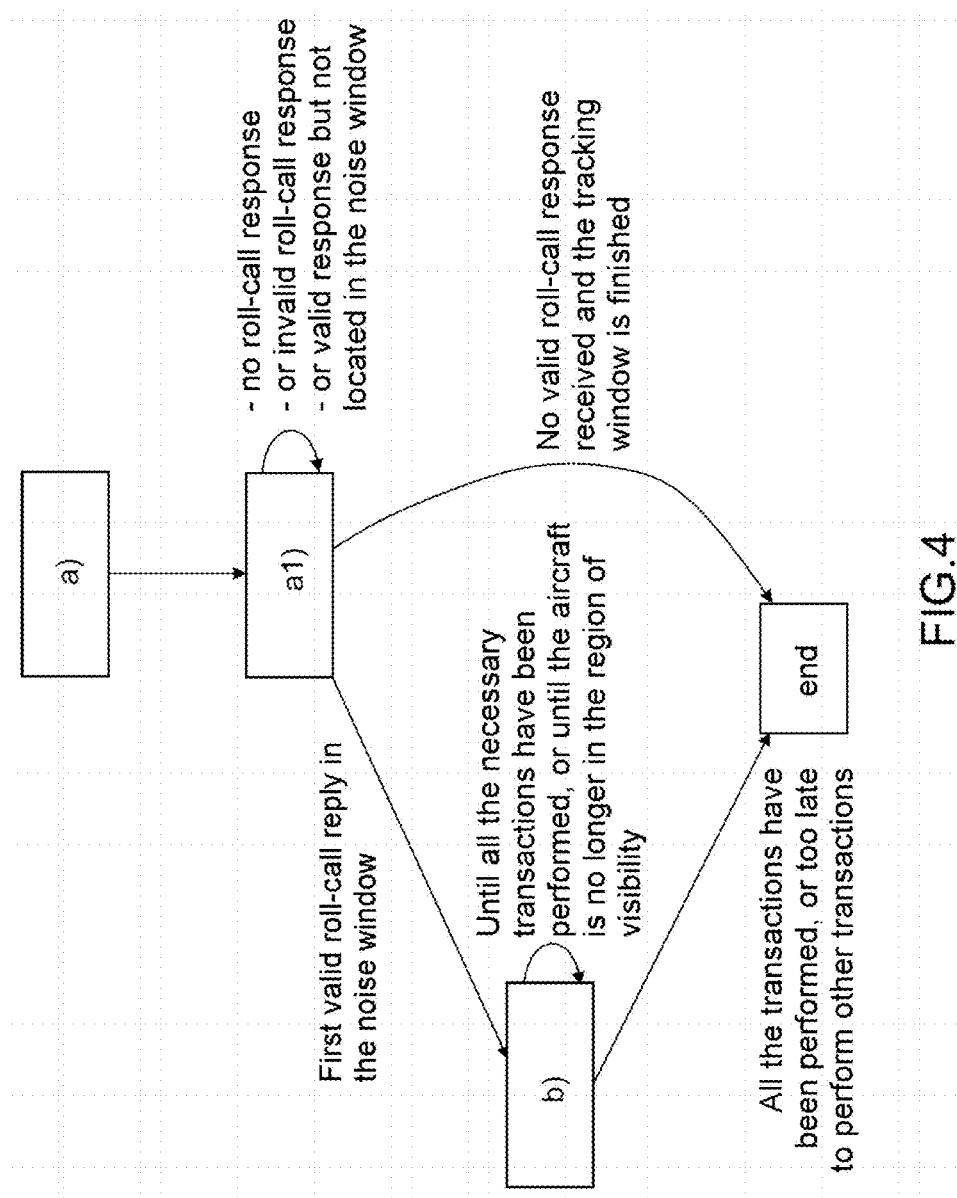
FIG. 4, the method according to the invention.

The method according to the invention is illustrated in FIG. 4.

In a first step a), the "seeking mode" is implemented until an aircraft is detected by the secondary radar.

As indicated above, the first monitoring window used in "seeking mode" is quite large in order to accommodate both the rate-related constraints specified in the European standard regarding Mode S and estimated uncertainties in the actual position of the aircraft.

The first monitoring window may be computed, for a given aircraft, on the basis of the speed of rotation of the antenna of the secondary radar, and of the aircraft position predicted for the following antenna revolution.

Figure 5:
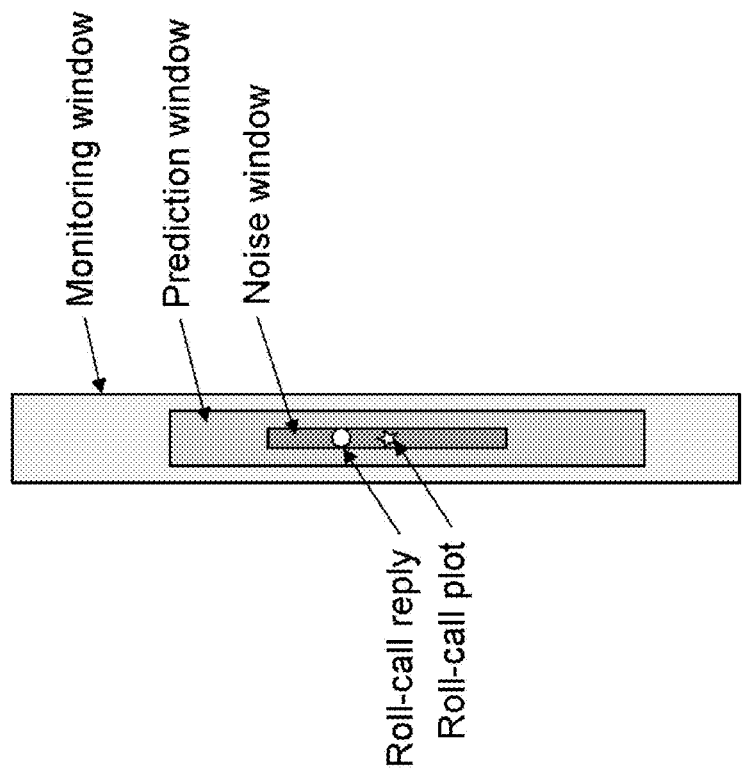
FIG. 5, the various windows used in the method according to the invention, and a representation of a reply and of the associated plot.
Figure 6:
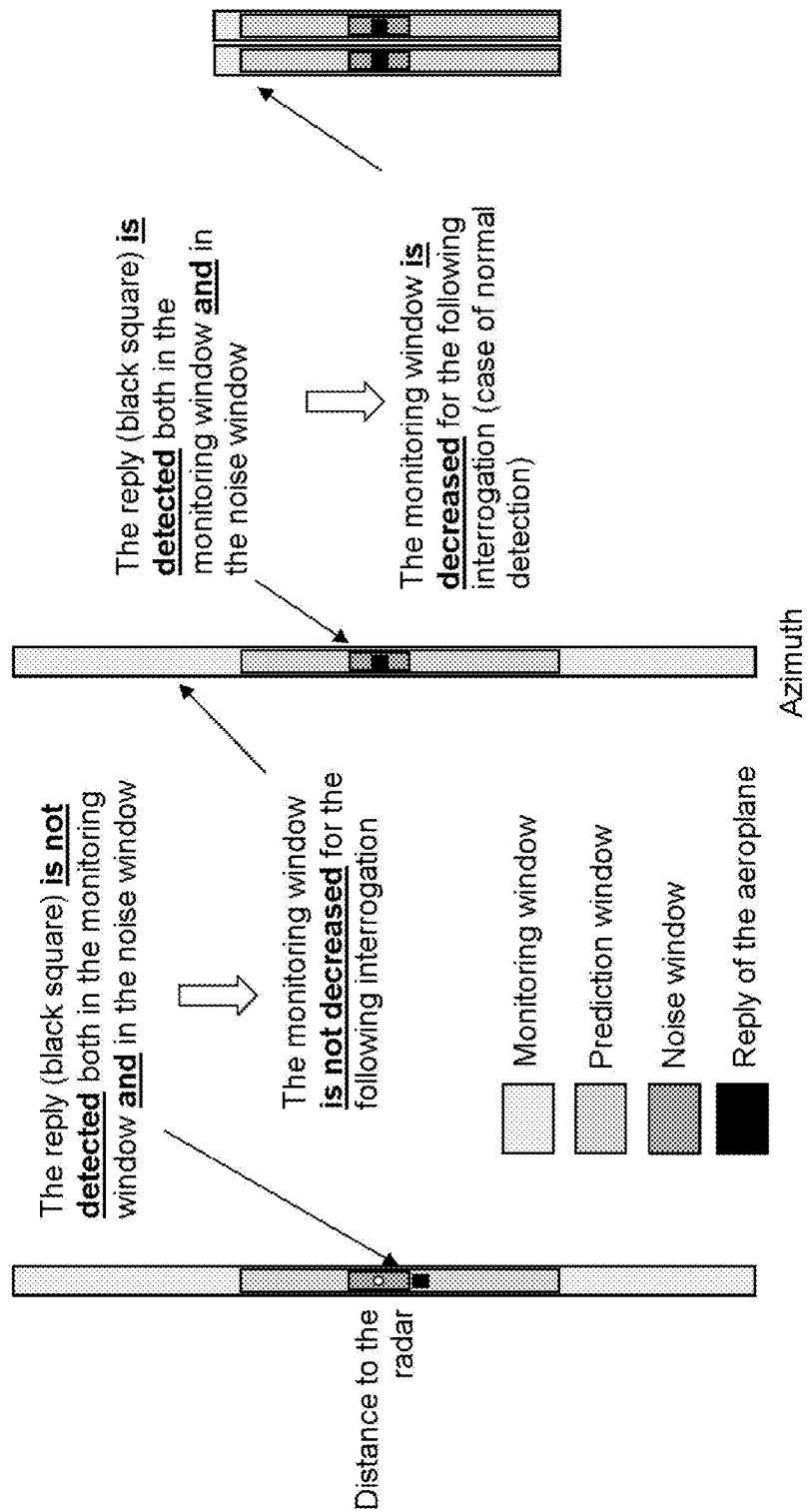
FIG. 6, the case where a new interrogation is made.

The monitoring window illustrated in FIG. 5 comprises a plurality of independent components: a prediction window and a noise window.

The prediction window, which is constructed around the predicted position of the aircraft, takes into account the rate-related variation criteria required by the European standard regarding Mode S, such as for example a transverse acceleration of up to 5 g and a longitudinal acceleration of up to 1 g.

The noise window, which is centred on the position of the aircraft, takes into account an estimate of measurement errors made in preceding interrogations and estimated inaccuracies in the prediction model used to predict the position of the aircraft.

The estimate of measurement errors is a manufacturer-provided datum.

The inaccuracies in the prediction model are estimated by the radar. They represent the difference between the ideal path of the aeroplane and the aeroplane position predicted by the radar. The ideal path of the aeroplane is computed assuming flight in a straight line at constant speed or a turn of constant transverse and longitudinal acceleration.

The inaccuracies in the predicted position of the aircraft are estimated on the basis of the discrepancy (azimuth, distance to the radar) between the measured positions and the predictions in preceding and current antenna revolutions (from when the object was first detected), integrated with respect to time via a recurrent filter (extended Kalman filter for example), and on the basis of radar detection errors (manufacturer-provided datum) and of uncertainty in the path models and integrated with respect to time (radar parameter defined by the operator).

In a given antenna revolution, once an aircraft has been detected in the antenna lobe of the secondary radar, and before detection switches to "tracking mode", the method comprises an intermediate step a1).

The intermediate step a1) comprises two sub-steps.

The first sub-step i) consists in detecting whether the reply of the aircraft to the roll-call interrogation is located in a noise window of the secondary radar.

There may be two reasons why the reply of the aircraft is not located in the noise window.

The first is related to a start or an end of a manoeuvre of the aircraft, namely a transverse acceleration of up to 5 g or a longitudinal acceleration of up to 1 g.

The second is that the received reply was not intended for the radar, this being typical in the event of a BDS swap. The protocol of Mode S does not make provision to identify the BDS register of the aircraft in the reply.

In this case, the secondary radar makes a new roll-call interrogation using the first monitoring window (second sub-step ii). The probability of a new BDS swap occurring is infinitesimal, and hence the reply of the target should be located in the noise window of the first monitoring window of the new interrogation.

Assuming, as is quite infrequently the case with civilian traffic, that the new reply from the aircraft, following the new roll-call interrogation, is not located in the noise window, a new roll-call interrogation is made using the first monitoring window, and so on.

The algorithm used to place the interrogations and monitoring windows must be able to take into account the new interrogations made to avoid the issue of BDS swapping, and to manage this slight extra processing load. The constraints on monitoring time are therefore temporarily greater.

Nevertheless, by virtue of this processing mode, the problem of BDS swapping is addressed immediately, and the device avoids track loss.

Once the intermediate step a1) has been performed, detection in "tracking mode" may be implemented. The "tracking mode" allows the aircraft to be tracked with a smaller monitoring window.

To do this, the radar carries out a series of roll-call interrogations, in a second monitoring window, of size smaller than the first monitoring window of the "seeking mode". The second monitoring window is of the smallest size necessary to capture the reply of an aircraft the distance of which to the radar is known exactly.

In a given antenna revolution, interrogations are made in "tracking mode" until all the transactions (interrogations/replies) have been carried out, or until the antenna of the radar is no longer pointing in the direction of the aircraft.

Moreover, if, in the intermediate step a1), no valid reply is received to any roll-call interrogation, and the scan has ended, the method ends.

The transmission times of the roll-call interrogations, whether in "seeking mode" or in "tracking mode", are determined dynamically depending on the expected positions of the interrogated aircraft. The algorithm used to place the interrogations must especially make it so that no expected reply is capable of being received at the same time as another reply to a second interrogation.

The method according to the invention does not require the transponders currently installed on aircraft to be changed, or even updated. Moreover, the update of the secondary radars may be rolled out gradually. It is not necessary for all the secondary radars of a given region to implement the method according to the invention.

The invention also relates to a secondary radar able to implement the aforementioned method. The secondary radar according to the invention is not structurally different from the secondary radars known to those skilled in the art, with the exception that its processing module is configured to insert additional interrogation windows in the event of a BDS swap.

The invention claimed is:

1. A method for managing a secondary radar operating in Mode S, said method using only secondary radar measurements, the method comprising, within a given antenna revolution, for each detected aircraft:
   a) detecting an aircraft in seeking mode, said seeking mode being implemented until the aircraft is detected by the secondary radar for the first time in said given antenna revolution, the seeking mode comprising a plurality of all-call secondary-radar interrogation periods, and a plurality of roll-call interrogation periods, in a first monitoring window, the first monitoring window comprising a first noise window;
   b) detecting the aircraft in tracking mode, said tracking mode being implemented if a valid response to a roll-call interrogation was detected in seeking mode, the tracking mode comprising a plurality of all-call interrogation periods, and a plurality of roll-call interrogation periods, in a second monitoring window, said second monitoring window being around an aircraft position predicted by the secondary radar in response to a previous all-call and/or roll-call interrogation;

the method comprising an intermediate step a1), which is executed between the detection in seeking mode and the detection in tracking mode, said intermediate step comprising:

i) detecting the presence or absence of the reply of the aircraft in a second noise window of the secondary radar;

ii) carrying out at least one roll-call interrogation, using the first monitoring window, if the reply of the aircraft is not located in said noise window.

2. The method according to claim 1, wherein the secondary radar comprises an antenna, the first monitoring window being computed, for a given aircraft, on the basis of the speed of rotation of the antenna of the secondary radar, and of an aircraft position predicted for the following antenna revolution.

3. The method according to claim 2, wherein the predicted aircraft position is computed on the basis of all the possible aircraft positions, these being computed on the basis of the known path of the aircraft and of rate-related aircraft parameters received by the secondary radar.

4. The method according to claim 2, wherein the predicted aircraft position is computed on the basis of a set of computed discrepancies, a discrepancy corresponding to the difference between an estimate of the position of the aircraft and an aircraft position measured in one of the preceding revolutions starting from when the aircraft was first detected.

5. The method according to claim 4, wherein the discrepancy is integrated with respect to time using a recurrent filter.

6. The method according to claim 5, wherein the recurrent filter is an extended Kalman filter.

7. The method according to claim 4, wherein the predicted aircraft position is computed on the basis of the measurement error of the radar.

8. The method according to claim 1, wherein the noise window is computed on the basis of the difference between an ideal path of the aircraft and an aircraft position predicted by the secondary radar.

9. The method according to claim 8, wherein the ideal path of the aircraft is computed on the basis of a set of assumptions stating that the aircraft will fly along a straight path at a constant aircraft speed.

10. A secondary radar, configured to implement the method according to claim 1.

* * * * *